May 9, 1944.    L. L. CUNNINGHAM    2,348,454
CONTROL DEVICE
Filed June 30, 1942    2 Sheets-Sheet 1
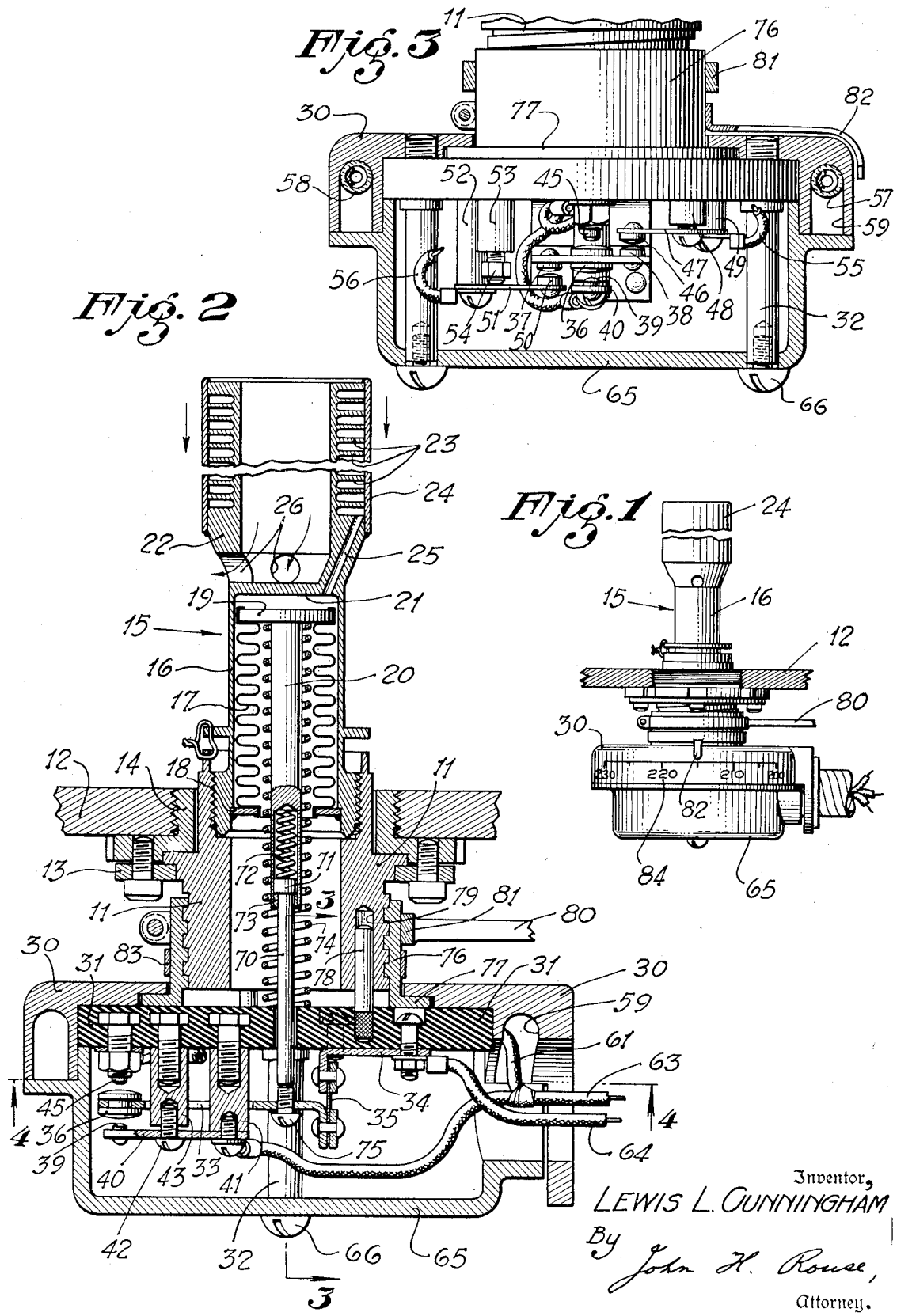
Inventor,
LEWIS L. CUNNINGHAM
By John H. Rouse,
Attorney.

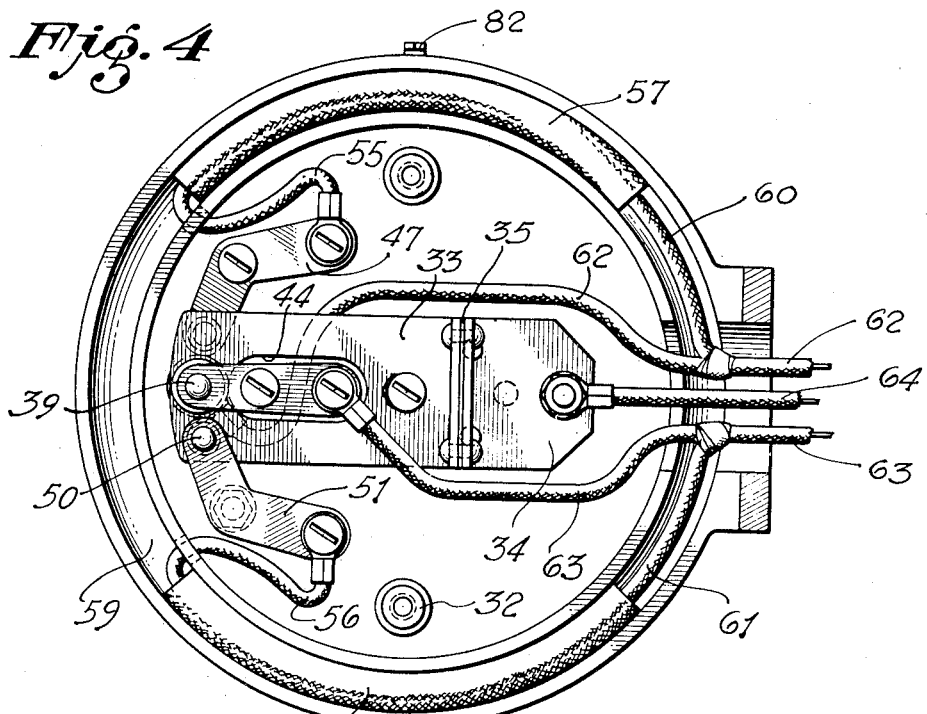

Patented May 9, 1944

2,348,454

UNITED STATES PATENT OFFICE 2,348,454

CONTROL DEVICE

Lewis L. Cunningham, Los Angeles, Calif., assignor to General Controls Co., Glendale, Calif., a corporation of California Application June 30, 1942, Serial No. 449,074

1 Claim. (Cl. 200—140)

My present invention relates to control devices of the type wherein means movable in response to change in a condition, such as temperature, pressure, or the like, are provided for operating means for controlling the degree of that condition, such as switching means or pilot valves which in turn control condition changing means; additional means being provided whereby the operative relation between the condition responsive means and the controlling means can be varied, as in accordance with the operative position of a device controlling the condition. Such additional means is an essential element of condition-controlling "follow-up" systems, in connection with a typical example of which the device of the present invention will be described in detail hereinafter.

An object of this invention is to provide a device of the character described in the form of a simple, compact, unitary structure wherein the means for varying the relation, or position, of the controlling means with respect to the condition responsive means comprises a single moving part.

Another object is the provision of a device of the character described wherein the means for positioning the controlling means also serves to support or mount the same.

Another object is the provision of a hollow, threaded connection for mounting and positioning the controlling means, through which connection the condition responsive moving means extends.

Other objects and advantages of the invention will be found in the description, the drawings, and the appended claim; and for complete understanding of the invention reference may be had to the following detailed description and accompanying drawings, wherein:

Figure 1 is a side elevation of a control device embodying my invention;

Figure 2 is an enlarged longitudinal sectional view of the device shown in Fig. 1;

Figure 3 is a fragmentary transverse section taken along the line 3—3 of Fig. 2, through the sub-base 30 and cover 65;

Figure 4 is a bottom plan of the device shown in Fig. 2, with cover 65 removed; and Figure 5 is a schematic view of the device illustrated in the other figures, and of an electrically controlled fluid pressure motor, the positioning of which the device is adapted to control.

In the drawings, the numeral 11 indicates a hollow cylindrical base or support for the device whereby it can be mounted as on a wall 12, a flanged portion of the base being clamped by a ring 13 to a flanged fitting 14 threaded in an opening through the wall, such arrangement permitting angular adjustment of the device. Threaded in the upper end of the hollow base 11 is a temperature responsive device, generally indicated at 15, which extends through the opening in wall 12, the upper side of which wall may define a space the temperature of which is to be controlled—such as, for example, that of the liquid tank or radiator of a liquid-cooled airplane engine.

The temperature responsive device 15 is of the type disclosed in the copending application of William A. Ray, Serial No. 441,773, filed May 5, 1942, and comprises a lower tubular portion 16 within which is an expansible-contractible metallic bellows 17. The bottom end of the bellows is secured, as by solder, to a washer 18 which in turn is soldered to the tube 16; the top end of the bellows being soldered to the head 19 of a movable stem 20 which extends downwardly within the bellows and through the washer 18. The upper end of the tubular portion 16 is closed by a wall 21, from which integrally extends a long upper tubular portion 22. This portion has a relatively thick wall, the outer surface of which is machined to provide a plurality of spaced fins 23. Surrounding the portion 22 and sealingly secured at its ends thereto, as by solder, is a tube 24. As illustrated, the fins 23 are formed as a continuous helix so that the space between the tube 24 and the portion 22 is divided by the fins into an elongated helical passage which communicates at its lower end, by an opening 25 through the wall 21, with the space within the lower tubular portion 16 around the bellows 17 and head 19; this space and the helical passage being charged with a thermostatic liquid. The fins 23 effect good transfer of heat to the liquid both from the outside and from the central passageway of the thermostatic unit constituted by the upper portion 22, openings 26 in the lower end of this unit permitting fluid circulation through its central passageway. It will be understood that all parts of the temperature responsive device 15 are of metals having good heat-conducting properties, such as copper or brass.

Mounted on the lower end of the hollow base 11 is a centrally apertured sub-base 30 which carries controlling means in the form of a switching mechanism. This mechanism is mounted on an insulating disk 31 which is secured to the sub-base by a pair of studs 32, and comprises an arm 33 which is rockably mounted at one end on a bracket 34, secured to the disk 31, by a yieldable metal strip or blade 35 which is so flexed as to urge the free end of the arm upwardly. As is best seen in Fig. 3, the arm 33 carries centrally of its free end a double-faced main contact 36 and a pair of auxiliary contacts 37 and 38, located on either side of the main contact. Cooperable with the lower face of the main contact is a relatively fixed contact 39 mounted on one end of an arm 40 which is supported at its other end by a post 41 (Fig. 2) the arm being flexed downwardly into engagement with the head of a screw 42 extending through an opening in the arm and threaded in another post 43 for vertical adjustment of the contact-carrying end of the arm; both of the posts 41 and 43 extending through an elongated opening 44 (Fig. 4) in the arm 33 and being secured to the disk 31. Cooperable with the upper face of the main contact 36 is a contact screw 45 fixedly secured in the disk 31. Cooperable with the upper auxiliary contact 38 (Fig. 3) is a relatively fixed contact 46 carried by an arm 47 (bent edgewise as shown in Fig. 4) which is adjustably supported by a pair of posts 48 and 49 in a manner similar to that in which arm 40 is supported. The other, or lower, auxiliary contact 37 cooperates with a contact 50 carried by an arm 51 which also is adjustably supported by another pair of posts 52 and 53 in a manner similar to that in which arm 46 is supported except that in this instance the arm is upwardly flexed and is adjusted by a backing-off screw 54 threaded in post 53. It will be noted that the arm 47 can yield when upward pressure is applied to contact 46, and that arm 51 is similarly yieldable in a downward direction. It will also be noted that the pairs of main contacts 36, 45 and 36, 39 are spaced farther apart than are the corresponding pairs of auxiliary contacts 38, 46 and 37, 50.

The contacts 46 and 50 are electrically connected, respectively, through their arms 47 and 51 and wires 55 and 56 to one end of resistance elements 57 and 58 (Fig. 4) which rest in an annular recess 59 formed in the undersurface of the sub-base 30; the other ends of the resistance elements being connected to wires 60 and 61 which are spliced to wires 62 and 63 which extend from the supports of the main fixed-contacts 45 and 39, each respectively. The main and auxiliary movable-contacts 36, 37 and 38 are electrically connected through arm 33, blade 35 and bracket 34 to another wire 64. The switching mechanism is provided with a cover 65 which is attached to the sub-base 31 by screws 66 threaded in the outer ends of the studs 32.

For actuating the switch arm 33, a connection is provided between it and the movable stem 20 of the temperature responsive device 15. This connection comprises a rod 70 having a head 71 of a size to slide in a bore formed in the bottom end of the stem 20. The rod is restrained from movement relative to the stem by a compression spring 72, which holds the underside of the rod head 71 in firm engagement with a bushing 73 surrounding the upper portion of the rod and secured in the mouth of the stem bore by solder. The spring 72 serves as a "strain-release" and is of such stiffness that relative movement of the rod and stem is permitted only in the event that the liquid pressure applied to the stem head 19 (due to temperature rise at the thermostatic unit 22) becomes excessive, and does not occur during the normal operation of the switching mechanism. Urging the stem assembly upward, is a spring 74 surrounding the stem and rod and compressed between the stem head 19 and the insulating disk 31. The lower end portion of the rod 70 extends freely through a central opening in the insulating disk 31 so that its extremity engages an adjusting screw 75 threaded in the movable contact arm 33, which screw after final adjustment is locked in position by solder.

Adjustably mounting the sub-base 30, and the controlling means associated therewith, on the cylindrical base 11 is a sleeve 76 which is internally screw-threaded to cooperate with threads formed on the periphery of the base; the sleeve extending through the central aperture of the sub-base and having a flanged bottom portion 77 which is a free sliding fit in a recess formed by the upper surface of the insulating disk 31 and an undercut in the inner edge of the sub-base. To prevent rotation of the sub-base with respect to the base when sleeve 76 is turned, a plurality of guide pins 78 are provided which are fixed in the disk 31 and slide in bores 79 formed in the bottom of base 11. For turning the sleeve 76, a handle 80 is provided which is clamped to the sleeve by a strap 81. By this arrangement, it will be seen that when handle 80 is operated, the switching mechanism is adjusted with respect to the actuating rod 70; the adjusting means also serving as the sole support for the switching mechanism. For indicating the setting of the switching mechanism, there is provided an indicator 82, attached by a strap 83 to the sleeve 76, which cooperates with temperature graduations 84 (Fig. 1) inscribed on the periphery of the sub-base.

Referring now to Fig. 5 of the drawings, the operation of the device illustrated in Figs. 1–4 will be described in connection with the control of a four-way electrically operated valve which in turn controls the operation, or positioning, of a fluid pressure motor, between which motor and the control device a "follow-up" connection is provided whereby the movable element of the motor is positioned in accordance with the temperature at the thermal unit of the control device. In the schematic showing of Fig. 5, the parts of the control device have been assigned reference numerals which are the same as those of the corresponding parts of the structure shown in the other figures. For the sake of simplicity, the sleeve 76, whereby the switching mechanism is moved with respect to the temperature responsive actuating means, has been omitted; the insulating disk 31 being merely represented as slidable within a pair of fixed walls 90.

The four-way valve, schematically shown, may be of the type disclosed in the copending application of William A. Ray, Serial No. 447,228, filed June 16, 1942, and comprises four independent electromagnetically-operated valve units 91, 92, 93 and 94. These units are of like construction and each comprises an electromagnet 95 and a disk-shaped armature-closure-member 96 which is spring-biased into engagement with its seat 97 and attractable to open position upon energization of the electromagnet. The inlets (or space "above" the closure members) of the valve units 91 and 93 are connected together, and to a source (not shown) of fluid under pressure, by a T-connection 98; and the outlets (or space "below" the closure members) of the other valve units 92 and 94 are connected together, and to an exhaust for the pressure fluid, by a T-connection 99. The outlet of unit 91 is connected by another T-connection 100 to the inlet of unit 92 and to one chamber 101 of a fluid pressure motor comprising a cylinder 102 within which a piston 103 is reciprocable; the other motor chamber 104 being connected to the outlet of unit 93 and the inlet of unit 94, in common, by a connection 105. The diagonally opposite pair of units 91 and 94 are electrically connected together for simultaneous operation by wires 106 and 107; the other diagonally opposite pair 92 and 93 being connected in a like manner by wires 108 and 109; an electrical ground "return" is provided for each valve unit, as indicated. It will be seen that when valve units 91 and 94 are operated by connecting a source of electrical energy to wire 109, pressure fluid can flow through unit 91 to the chamber 101 of the motor, the fluid in the other chamber 104 exhausting through valve unit 94; the result being that the piston is moved in a right-hand direction. Likewise, when the source of energy is connected to wire 106, the other valve units 92 and 93 are operated and pressure fluid flows to chamber 104 and exhausts from chamber 101; the piston moving in a left-hand direction.

Extending from the motor piston 102 is a stem 110 which is connected to operate means (not shown) for controlling the temperature of the space wherein the thermostatic unit 22 is located; such means being, for example, when the thermostatic unit is in the liquid tank or radiator of a liquid-cooled airplane engine (as was mentioned hereinbefore), the flaps or vanes which must be positioned to control air flow to the radiator. The piston stem 110 is also connected, through a bell-crank 111 and a link 112, to the movable insulating plate 31, so that movement of the piston effects corresponding movement of the switching mechanism with respect to the switch-actuating rod 70.

The operation of the system shown in Fig. 5 is as follows: If the temperature at the thermostatic unit 22 rises, the resultant expansion of the liquid forces the bellows head 19 downward, thereby through rod 70 effecting downward movement of switch arm 33 and engagement of the auxiliary contact 37 with contact 50. Current now flows from the source 113, through the switch arm 33, contacts 37 and 50, resistance unit 58, and wires 63, 106, 108 to the electromagnets of valve units 91 and 94. Due to the resistance 58, the flow of current is not now sufficient to operate the valve units. Continued downward movement of the switch arm, however, effects engagement of the main contacts 36 and 39 (the supporting arm of contact 50 yielding in this movement) and the current is now by-passed around the resistance 58 so that the valve units 91 and 94 are operated. The resultant movement of the piston stem 110 in a right-hand direction effects (through the follow-up connection) downward movement of disk 31 so that the main contacts 36 and 39 are immediately disengaged. However, the current still flowing (through contacts 37 and 50) to the valve units through the resistance 58 is sufficient to maintain the armature-closure-members in their attracted, or open, position; it being a well-known fact that a smaller amount of electrical energy is required to hold an armature in attracted position than is required to move it to that position through space, due to the change in reluctance of the magnetic circuit. The conditions are therefore such that the piston continues to move until disengagement of contacts 37 and 50 is effected, whereupon the valve units 91 and 94 close, and, since the other valve units are also closed, the piston remains in its moved position—the air flaps of the airplane engine being held in a somewhat wider-open position.

The sequential-contact and resistance arrangement thus effects a positive differential of operation which reduces the frequency of operation of the valve units necessary to produce a predetermined change in position of the piston; another beneficial result of this arrangement being the substantial elimination of arcing at the contacts due to "fluttering." This feature is disclosed in U. S. Patent No. 2,237,578 granted April 8, 1941 to William A. Ray.

Should the temperature continue to rise, the above-described operation is repeated, the movement of the piston being checked after it has progressed still farther in a right-hand direction; the switch disk 31 then being in a correspondingly lower position. If the temperature at the thermostatic unit now falls, the resultant upward movement of rod 70 effects, first, engagement of the upper auxiliary contact 38 with the yieldably-mounted contact 46, and then, engagement of the main contacts 36 and 45 (the contact arm, due to the bias provided by the hinge blade 35, following the rod 70); the other pair of valve units 92 and 93 accordingly being operated. Pressure fluid now flows to the motor chamber 104 through unit 93, and exhausts from chamber 101 through unit 92; the piston therefore moving in a left-hand direction so that the switch disk 31 is raised, through the follow-up connection, to check the piston movement; the desired differential of operation now being effected by the resistance 57. While I have herein shown and described a specific embodiment of my invention, I wish it to be understood that modifications may be made without departing from the spirit of the invention; such as, for example, the substitution for the switching mechanism of pilot-valve means for directly controlling a fluid pressure motor. I intend therefore to be limited only by the scope of the appended claim.

I claim as my invention:

In a control device: a relatively fixed base; a sub-base; a threaded sleeve interconnecting said bases and rotatable to vary the relative position of the bases along the axis of the sleeve; said sleeve being internally threaded at one end to cooperate with an externally-threaded portion of said fixed base and having at its other end an outwardly-extending lateral flange, providing a surface of relatively large area, rotatable in a recess in said sub-base; means for preventing relative angular movement of the bases when said sleeve is rotated, comprising a pin secured to one of the bases and slidable in an opening in the other of the bases, the axis of said pin being parallel to the axis of relative movement of the bases; said bases being free from engagement with each other so that said flange and said pin serve as the sole support for said sub-base; means movable substantially along the axis of said sleeve in response to change in a condition and so mounted on said fixed base that a movable portion thereof extends within the sleeve toward said sub-base; and means mounted on the sub-base for controlling said condition and operatively engageable by said portion.

LEWIS L. CUNNINGHAM.